March 1, 1960

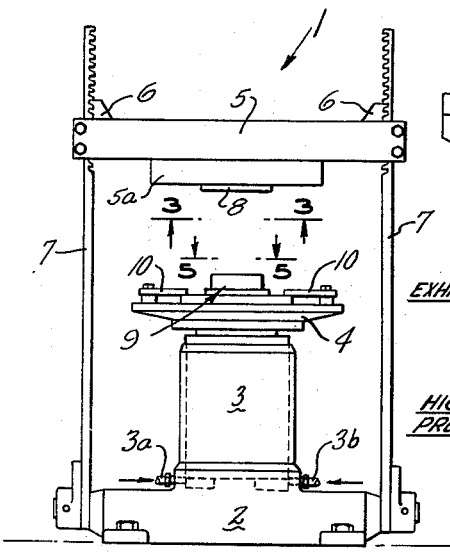

T. C. WILLSON, JR 2,926,385

SHEET SHAPING

Filed Aug. 6, 1953

INVENTOR
THOMAS C. WILLSON, JR
BY Bates & Willard
ATTORNEYS

United States Patent Office 2,926,385
Patented Mar. 1, 1960

2,926,385

SHEET SHAPING

Thomas C. Willson, Jr., Haverstown, Pa., assignor to Plax Corporation, West Hartford, Conn., a corporation of Delaware Application August 6, 1953, Serial No. 372,702

3 Claims. (Cl. 18—19)

The present invention relates to the reformation of flat plastic sheet material into articles of various shapes. Generally, sheet reformation practices are referred to as sheet shaping or sheet forming operations. The terminology as understood by those in the art does not refer to the forming of the plastic into flat sheet despite any suggestion which the terms may convey to that effect.

The sheet materials to which the invention is applicable include most, if not all, which are either permanently or temporarily thermoplastic. Sheets of these materials may be manufactured in a variety of ways, including extrusion, casting, drawing, calendering, pressing and numerous modifications and combinations thereof.

As is well recognized, attempts have been made from time to time to provide for rapidly forming shaped articles from thermoplastic sheets, it has been found difficult to successfully draw articles from sheets or webs of thermoplastic material. This is probably due to lack of understanding of the characteristics of these materials and failure to properly handle such material during operation of the various devices necessary for holding, heating, separating and drawing blanks from endless webs of thermoplastic material.

The problem of providing satisfactory forming practice is particularly difficult for those thermoplastic sheet materials in which stretching stresses are captured. These captured stresses generally referred to as orientation stresses are introduced and captured both monoaxially and biaxially to improve the strength, flexibility and other characteristics of the sheet.

Examples of such sheets are the biaxially oriented polystyrene and methacrylate sheet materials sold by the Plax Corporation under the trademark Polyflex and Methaflex, respectively.

Heretofore considerable difficulty has been encountered in finding a practice which is economically and commercially acceptable for forming articles and such sheet materials.

It is an object of this invention to provide method and apparatus for such a practice. While particularly adapted for forming biaxially oriented sheet, the invention is not limited thereto.

A more specific object of the present invention is to preserve the orientation distribution of sheet in the articles formed therefrom and to prevent molecular migration and redistribution and preserve orientation.

It is a further object to preserve the thickness distribution of the sheet when the heated sheet is subject to a stress pattern differing from that captured in the sheet. This difference in stress pattern may result from heating some portions of the sheet prior to others through the unfreeze or stress releasing temperature point or otherwise subjecting softened sheet to a distribution of stresses differing from those exerted and captured when the sheet was previously cooled through the freeze or capture point.

Other objects are to provide improved method and apparatus for cutting the shaped articles from the remainder of the sheet from which they are formed.

Other objects and advantages are indicated in or apparent from the following description of an illustrative embodiment of the invention which is made with reference to the accompanying drawing, in which:

Figure 1 is a generally schematic front elevation view of a press embodying the invention;

Fig. 2 is a time chart showing the cyclic operation of the press in accordance with the invention;

Fig. 3 is an enlarged view, taken on line 3—3 of Fig. 1, showing the plan of the upper or heating platen portion of the press;

Fig. 4 is a cross-section view taken on line 4—4 of Fig. 3;

Fig. 5 is an enlarged view taken on line 5—5 of Fig. 1 showing the plan of the lower or die portion of the press;

Fig. 6 is a cross-section view taken on the broken line 6—6 of Fig. 5 with an overlying sheet of thermoplastic material;

Figure 7:
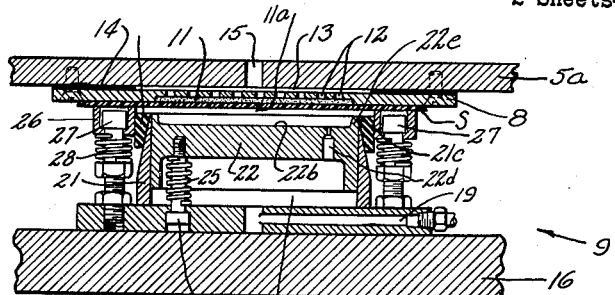
Figure 8:
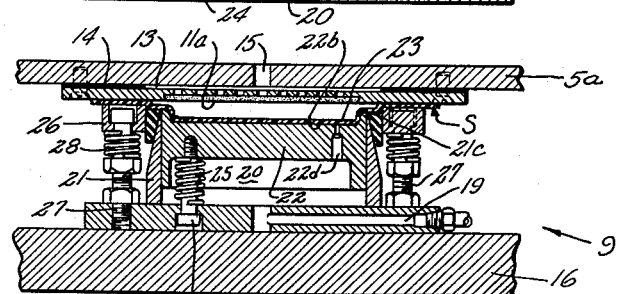
Figure 9:
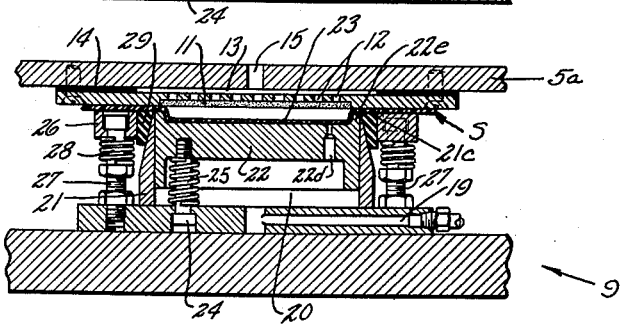
Figure 10:
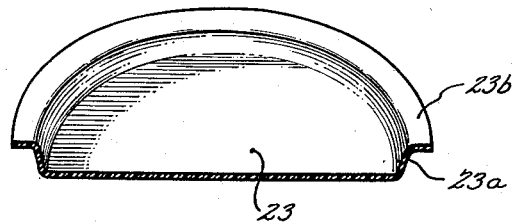

Figs. 7–9, inclusive, are cross-section views, similar to Fig. 6, of the die and heating platens when the press is closed and showing successive steps in the forming of the sheet; and Fig. 10 is a perspective view broken away of half the article formed and cut from the sheet.

Referring to Fig. 1, there is there shown schematically a press, generally designated 1, including a bed 2 having a hydraulically or otherwise operated motor 3 for reciprocating a movable press platen 4 into and out of pressing relationship with a stationary platen 5 which is adjustably secured as at 6 by rods 7 to the press bed 2. In the illustrated embodiment, the stationary platen 5 is located above the movable force platen 4. However, it will be understood that this relationship may and will be reversed when found to be advantageous. Moreover, while the platens 4 and 5 of the illustrated press are shown horizontally disposed with the platen 4 vertically movable and the platen 5 vertically adjustable, it should be understood that the press may be otherwise oriented, as for example with the platens vertically disposed for movement and adjustment in a horizontal direction.

One of the platens carries a heating plate and the other a forming or shaping die. In the illustrated embodiment, a heating plate 8 is secured, as by screws 8a, to a depending block portion 5a of the stationary platen 5 and a forming die, generally designated 9, is removably secured as by dogs 10 to the movable platen 4.

As shown in Figs. 3 and 4, a porous plate 11 is inserted flush within a conforming recess in the plate 8 and covers a number of spaced openings or passages 12, each of which extends from the porous plate 11 through the plate 8 and communicates with a chamber 13 formed between the plate 8 and the platen block 5a by an air tight gasket 14. The porous plate 11 may be formed of sintered metal or otherwise provided with numerous closely spaced microscopic passageways therethrough.

A passageway 15 through the platen provides means for connecting the chamber 13 with sub and superatmospheric pressure sources (not shown) as may be desired, suitable conventional valving and timing means or hand controls being employable to effect desired cyclic operation, such as the illustrative cycle shown in Fig. 2.

Heating of the plate 8 may be effected electrically, or otherwise, and controlled in accordance with any well known practice so as to impart the necessary heat to soften thermoplastic sheet S for reshaping.

The sheet S may be formed of any of a wide range of thermoplastics. It may be supplied as an individual blank, as shown, or successive portions of a roll or other continuous supply may be progressively strip-fed stepby-step between the heating plate 8 and die 9 for reshaping with the die 9.

In the embodiment shown in Figs. 5 and 6, the die 9 includes a base plate 16 which is secured, as by bolts 17, a plate 18 having a passageway 19 which serves to connect a chamber 20 with the sources of sub and superatmospheric pressures selectively through suitable valves (not shown). The chamber 20 is formed by top surface 18a of the plate 18, inner wall 21a of a cutter 21 and underside 22a of a die 22 the top surface 22b of which defines a cavity for reshaping the sheet S. The particular cavity shown is shaped to form the shallow dished cover or cap member 23, shown in Fig. 10, for cottage cheese cups and other containers. However, it will be understood that the cavity may be otherwise shaped to form any of a wide range of articles from the thermoplastic sheet.

As shown in Fig. 6, bolts 24 and compression springs 25 yieldably hold the die 22 spaced above the plate 18. The outer cylindrical surface 22c of the die conforms to the inner surface 21a of the cutter and centers the latter relative to the die while permitting sliding movement therebetween.

A stripper ring 26 is disposed about the die 22 and similarly is yieldably secured to the plate 18 by bolts 27 and compression springs 28. A yielding gasket 29 of rubber or the like is fitted between the ring 26 and cutter 21 to provide a substantially air-tight seal therebetween. Inner surface 29a of the gasket preferably is tapered downwardly and outwardly to conform to the inwardly and upwardly tapering outer wedging surface 21b of the cutter to improve the tight fit of the seal when the press is closed.

While not necessary to the illustrated embodiment, the gasket has a shoulder underlying the stripper 26 to retain the gasket in position in those instances where the die 22 may be disposed upside-down from the illustrated position.

The illustrated apparatus may be operated as hereinafter described. Assuming the platens 4 and 5 of the press 1 are open, as shown in Fig. 1, a sheet S is manually or otherwise fed to a position between the hot plate 8 and the die 9. Thereafter, the following operations are effected in sequence, an illustrative timing cycle of which is indicated by chart (Fig. 2). This timing may be maintained by a mechanical timer or may be manually maintained with suitable valves (not shown).

First, relatively low pressure air is introduced into the motor 3 through line 3a to raise the die 9 and cause the stripper plate 26 to press the sheet S against the heating plate 8, as shown in Fig. 7. Thereafter a vacuum or subatmospheric pressure is exerted in the line 15, chamber 13 and through the passages 12 and fine pores of the insert 11 so as to expose the top surface of the sheet S to the subatmospheric pressure. Consequently, atmospheric pressure on the lower side of the sheet S holds the sheet firmly at every point in non-movable engagement with the insert 11 during heating.

In accordance with the invention, some preheating of the sheet may be effected either by the hot plate 8 or, prior to moving the sheet thereto, by other preheating means (not shown). If, for example, the hot plate 8 and the die 9 are interchanged, so that the plate 8 is on the lower or moving force platen 4, the sheet S may be preheated by contact with the plate 8 prior to being pressed against the die 9. However, regardless of whether the sheet S is or is not preheated prior to movement to the heater, the overall firmly held surface engagement with the plate 8 should be established before any portion of the sheet is heated to its softening or unmolding temperature. This is particularly important where the sheet S is highly oriented. Overall surface engagement with the plate under pressure prevents unmolding or deformation of the sheet S. Thus, even though portions of the sheet are heated and pass through the unmolding or softening point at different times, no unmolding takes place. Were it not for this overall restraint, the portions first heated would unmold producing thickness irregularities and the sheet would become objectionably distorted.

As soon as the portion of the sheet to be reshaped has been heated to the desired forming temperature, the subatmospheric pressure in line 15 is replaced by superatmospheric pressure of the order of 60 to 80 p.s.i. and the softened sheet quickly blown into shaped engagement with the die cavity 22b as shown in Fig. 8. The cavity 22b may be vented to atmosphere through minute passages 22d which open into the chamber 20 or the difference in pressures on opposite sides of the sheet S may be augmented by establishing a vacuum or subatmospheric pressure in the chamber 20 through line 19. It will be understood that the vacuum in chamber 20 may be sufficient and preferable in some instances for creating the necessary shaping differential pressure when only atmospheric pressure is exerted through line 15 on the top of the sheet. This, however, normally will not be the case, particularly where sheet of appreciable orientation and thickness, such as here contemplated, are employed.

Preferably both the forming cavity wall 22b and the heating surface 11a of the insert are smoothly polished to preserve the polish of the sheet on the finished article 23. However, either or both surfaces may be etched or otherwise finished.

The shaped sheet is cooled below the softening point and set by engagement with the relatively cool surface 22b of the die 22.

The described operation accomplishes forming and trimming of plastic sheet materials. While particularly suitable for use with biaxially oriented plastic sheet, it is not limited to that type of material.

It will be apparent that the present process for forming commercially usable end-items, such as packaging material, involves combinations of a number of fundamental phases, including the following:

(a) Proper holding of oriented plastic in order to minimize or eliminate molecular migration and overall undesirable physical distortions. This phase involves, holding the oriented plastic stationary against the heating platen. Sufficient pressure is exerted on the sheet to combat molecular orientation forces which tend to unmold the softened sheet.

(b) Proper application and control of heat to obtain a workable molding temperature within the material without losing its orientation. The heating of oriented sheet involves first superfically heating without softening the sheet, and thereafter holding the sheet against molecular migration while heating all of the sheet through the softening point. The lag in time between the instant of heat application and the completion of softening is "soaking" or "dwell" time. The prevention of molecular migration and unmolding requires overall restraint of the sheet prior to softening of any portion of it. A heating platen temperature of 255–260° F. and forming die temperature of 160–170° F. are suitable for polystyrene, methylmethacrylate and most common thermoplastics.

(c) Proper blowing pressure applied to sheet, which in turn contacts a suitable forming die. The air pressure should be applied quickly in order to minimize molecular migration (unmolding) while sheet is free within the die cavity, and should be applied immediately following softening of all of the sheet to avoid material loss of orientation. The air pressure should be sufficient so that the plastic material can be driven completely and quickly "home" in the die.

Having drawn the softened portion of the sheet S into cooling and setting contact with the cold die 22, relatively high pressure air is introduced into the motor 3 through line 3b to overcome the restraint of the springs 28 and 25 and force cutting edge 21c of the cutter 21 upwardly against the plate 8 cutting through the shaped plastic sheet and thereby trimming the article 23 shown in Fig. 10. Thereafter all pressures are relieved and the press opened for removal of the article 23.

Preferably the portion of the plate 8 engaged by the knife blade 21c is soft material, such as brass, which will not dull the edge at an excessive rate. If desirable, the engaged portion may be a replaceable inset so that the entire plate 8 need not be replaced following excessive wear from repeated cutting operations.

If desired, annular shoulder 22e of the die may be removed so that the top of shaping surface 22b of the die extends all the way to cutter 21 so that the inner wall of the cutter 21 shapes the depending wall or skirt 23a of the drawn article 23 and the cutter 21 acts to cut at the skirt 23a and eliminate flange 23b of the illustrated embodiment.

It will be apparent to those skilled in the art that the novel principles of the invention disclosed herein in connection with specific exemplifications thereof will suggest various other modifications and applications of the same. It is accordingly desired that in construing the breadth of the appended claims, they shall not be limited to the specific exemplifications of the invention described herein.

Having thus described the invention, what I claim as new and desire to be secured by Letters Patent is as follows:

1. In apparatus for shaping articles from sheet thermoplastic material, a pair of platens movable into and out of pressing engagement, a hot plate on one of said platens and a die on the other of said platens, a stripper plate carried on one of said platens, means for closing the platens under pressure to a holding position to retain a peripheral portion of the sheet thermoplastic material between said stripper plate and the opposite platen, means for firmly holding the sheet material in overall surface heating engagement with said hot plate by fluid pressure acting on the sheet material, means for drawing the softened sheet material after heating into shaping contact with said die by fluid pressure acting on the sheet material, a cutter carried on one of said platens having the cutting edge thereof disposed inwardly toward the center of such platen relative to said stripper plate, and means mounting said stripper plate and cutter to effect trimming of the peripheral portion of the sheet material by said cutting edge upon closure of said platens beyond said holding position.

2. In apparatus as recited in claim 1, said hot plate including a porous section thereon to permit withdrawal of air from between the surface of said hot plate and the sheet material by application of vacuum.

3. A method of shaping articles from sheet thermoplastic material in a press having a pair of platens movable into and out of pressing relationship with a hot plate on one platen and a die and cutter on the platen opposite said hot plate comprising the steps of positioning a sheet of thermoplastic material between the platens, closing the platens under pressure to press and grippingly hold a peripheral portion of the sheet between said hot plate and die, creating a pressure differential across the sheet to force the central portion of such sheet into firm overall surface engagement with said hot plate, retaining said central portion of the sheet in engagement with said hot plate until the sheet is heated above its softening point, reversing said pressure differential to force the softened central portion of the sheet away from said hot plate and into shaping contact with said die, retaining said central portion of the sheet in contact with said die until it sets, and with the sheet still disposed between said platens applying additional closing pressure to the platens to urge said cutter against said hot plate and thereby trim the peripheral portion of the sheet from the shaped central portion.

References Cited in the file of this patent

UNITED STATES PATENTS

| | | |
|---|---|---|
| 2,120,328 | Ferngren | June 14, 1938 |
| 2,422,999 | Bagley | June 24, 1947 |
| 2,513,785 | Browne | July 4, 1950 |
| 2,521,388 | Maynard et al. | Sept. 5, 1950 |
| 2,660,757 | Smith et al. | Dec. 1, 1953 |
| 2,694,227 | Fordyce et al. | Nov. 16, 1954 |
| 2,702,411 | Winstead | Feb. 22, 1955 |